(12) United States Patent
Beaubien

(10) Patent No.: US 9,922,390 B2
(45) Date of Patent: Mar. 20, 2018

(54) WATERMARKING SYSTEM

(71) Applicant: Brady Jennings Beaubien, Culver City, CA (US)

(72) Inventor: Brady Jennings Beaubien, Culver City, CA (US)

( * ) Notice: Subject to any disclaimer, the term of this patent is extended or adjusted under 35 U.S.C. 154(b) by 209 days.

(21) Appl. No.: 14/846,144

(22) Filed: Sep. 4, 2015

(65) Prior Publication Data

US 2016/0071229 A1 Mar. 10, 2016

Related U.S. Application Data

(60) Provisional application No. 62/046,781, filed on Sep. 5, 2014.

(51) Int. Cl.
*G06T 1/00* (2006.01)

(52) U.S. Cl.
CPC .... *G06T 1/0028* (2013.01); *G06T 2201/0051* (2013.01)

(58) Field of Classification Search
None
See application file for complete search history.

(56) References Cited

U.S. PATENT DOCUMENTS

| | | | |
|---|---|---|---|
| 5,946,414 A | 8/1999 | Cass et al. | |
| 6,125,200 A | 9/2000 | Warnock | |
| 6,268,866 B1 | 7/2001 | Shibata | |
| 6,590,996 B1 | 7/2003 | Reed et al. | |
| 6,721,440 B2 | 4/2004 | Reed et al. | |
| 6,763,122 B1 | 7/2004 | Rodriguez et al. | |
| 7,062,067 B2 * | 6/2006 | Braudaway | G06T 1/0071 382/100 |
| 7,593,543 B1 * | 9/2009 | Herz | G06F 21/10 375/134 |
| 8,155,378 B2 | 4/2012 | Reed et al. | |
| 8,320,606 B1 * | 11/2012 | Moorer | G06T 1/0028 382/100 |
| 8,385,590 B1 * | 2/2013 | Moorer | H04N 21/8358 382/100 |
| 9,214,004 B2 * | 12/2015 | Agrawal | G06T 1/0021 |
| 2002/0021824 A1 * | 2/2002 | Reed | G06K 7/1417 382/100 |
| 2002/0032863 A1 * | 3/2002 | Ha | G06F 21/10 713/176 |
| 2004/0234098 A1 * | 11/2004 | Reed | G06T 1/0028 382/100 |

(Continued)

FOREIGN PATENT DOCUMENTS

| | | | | |
|---|---|---|---|---|
| KR | 1020130065277 A | 6/2013 | | |
| WO | WO 2008084433 A2 * | 7/2008 | | G06F 21/10 |

*Primary Examiner* — Delomia L Gilliard
(74) *Attorney, Agent, or Firm* — Michael Zarrabian; Pejman Yedidsion

(57) ABSTRACT

A method of watermarking includes determining a first substantially uniform color pixel space in a first frame of a video, determining a first offset color based on the first substantially uniform color pixel space, and compositing a first watermark trace of a watermark key having the first offset color into the substantially uniform color pixel space so that a modified video frame is creating having the first watermark trace of the watermark key having the first offset color.

20 Claims, 5 Drawing Sheets

(56) References Cited

U.S. PATENT DOCUMENTS

| | | | |
|---|---|---|---|
| 2005/0094848 A1* | 5/2005 | Carr | G06T 1/0064 382/100 |
| 2005/0175179 A1* | 8/2005 | Kesal | G10L 19/018 380/266 |
| 2006/0153377 A1* | 7/2006 | Arditti Modiano | H04L 9/0618 380/200 |
| 2008/0080009 A1* | 4/2008 | Masui | G06T 1/0028 358/3.28 |
| 2010/0215342 A1* | 8/2010 | Lee | H04N 5/913 386/241 |
| 2010/0299515 A1* | 11/2010 | Michiels | G06F 21/10 713/150 |
| 2011/0216936 A1* | 9/2011 | Reed | G06K 9/00 382/100 |
| 2013/0064419 A1* | 3/2013 | Sharma | G06T 1/0028 382/100 |
| 2013/0259294 A1* | 10/2013 | Mehta | G06T 1/0028 382/100 |
| 2013/0318550 A1* | 11/2013 | Geyzel | G06T 1/0028 725/25 |
| 2014/0119593 A1* | 5/2014 | Filler | G06T 1/0064 382/100 |
| 2015/0324948 A1* | 11/2015 | Cain | G06T 1/0092 382/100 |

\* cited by examiner

WATERMARKING SYSTEM

CROSS-REFERENCE TO RELATED APPLICATIONS

The present application is a continuation of U.S. Provisional Patent Application No. 62/046,781, filed Sep. 5, 2014, the disclosure of which is hereby incorporated by reference in its entirety.

BACKGROUND

Field of the Invention

The field of the invention relates to digital watermarking, and more particularly to watermarking of images and videos.

SUMMARY

A method of watermarking is disclosed that includes sampling a video to obtain a first sample frame, filtering the first sample frame to obtain a first filtered image, and searching a first substantially uniform color pixel space of the first filtered image for a first watermark trace. The method may also include performing a database lookup of a found first watermark trace to determine if the found first watermark trace is a complete watermark key, with a complete watermark key identifying a previous user. In such embodiment, the method may include sampling a second sample video frame if the found first watermark trace is not a complete watermark key, and searching a substantially uniform color pixel space of the second sample video frame for a second watermark trace. The second sample video frame may be a video frame that is immediately adjacent to the first sample frame or may be a video frame-of-interest whose location is determined from the database lookup of the found first watermark trace. A second database lookup of a second found watermark trace may be performed to determine if the first and second found watermark traces establish a complete watermark key. In one embodiment, the searching of the first substantially uniform color pixel space of the first filtered image may be restricted to a predetermined quadrant of the first filtered image to reduce the search time.

Another watermarking method may include determining a first substantially uniform color pixel space in a first frame of a video, determining a first offset color based on the first substantially uniform color pixel space, and compositing a first watermark trace of a watermark key having the first offset color with the substantially uniform color pixel space so that a modified video frame is creating having the first watermark trace of the watermark key having the first offset color. The method may also include rebuilding the video with the modified video frame. The watermark key may consists of the first watermark trace in the modified video frame. The method may also include determining a second substantially uniform color pixel space in a second frame of the video, determining a second offset color based on the second substantially uniform color pixel space of the second frame, and compositing a second watermark trace of the watermark key having the second offset color into the second substantially uniform color pixel space of the second frame of the video, so that a second modified video frame is creating having the second watermark trace of the watermark key. In some embodiments, the watermark key may include a plurality of watermark traces in a respective plurality of modified video frames, and the first and second frame locations of the respective first and second watermark traces of the watermark key are saved into a database in association with a user information, with the user information including the user's name. In certain embodiments, the method includes saving the frame location of the at least one watermark trace into a database in association with a user information, the user information comprising the user's name. The first watermark key may be a geometric symbol, or may be at least one alphanumeric symbol suitable for automated optical character recognition (OCR).

Another watermarking method may include collecting video user information, associating video user information with video identification information, receiving watermark key location information, and saving the video identification information and associated user information with the watermark key forensics in a database. The watermark key location information may include the location of a plurality watermark traces in a respective plurality of video frames. The watermark key location information may include an image quadrant location and a video frame. The method may also include performing a database lookup of found key traces.

BRIEF DESCRIPTION OF THE DRAWINGS

The components in the figures are not necessarily to scale, emphasis instead being placed upon illustrating the principals of the invention. Like reference numerals designate corresponding parts throughout the different views.

DETAILED DESCRIPTION

A system is disclosed that composites watermark key traces with substantially uniform color pixel spaces in respective frames of a video-of-interest, with the watermark key traces collectively defining a watermark key for later retrieval. The watermark key is associated with the video, video user, and transaction identifying information in a database. Using such a system, the uniform pixel spaces of watermarked videos may be later analyzed to discover the watermark key traces that collectively identify the watermark key for lookup in the database of the remainder of the associated video user and video transaction information.

Figure 1:
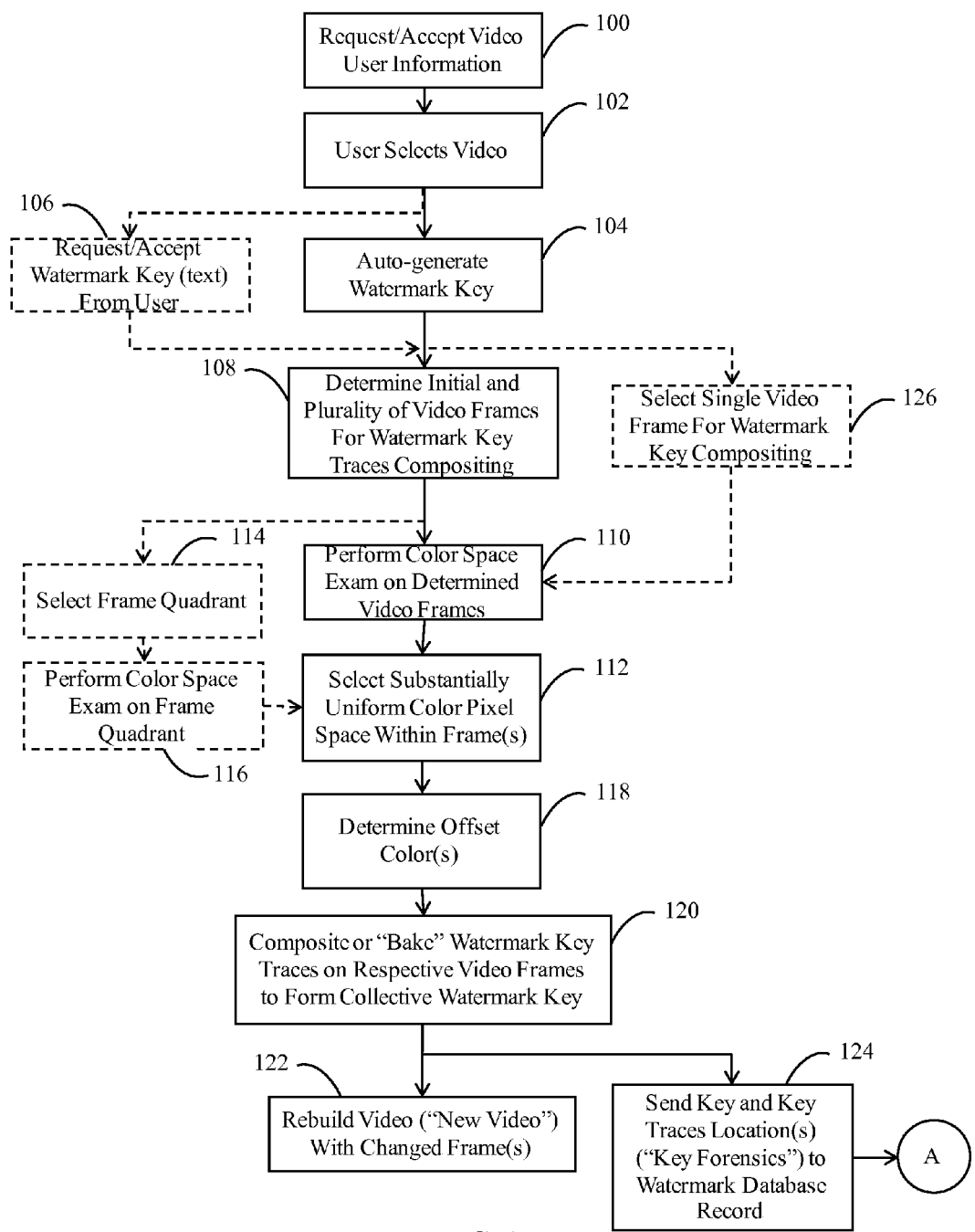
FIG. 1 is a flow diagram illustrating several embodiments of a method for embedding watermark traces of a watermark key in substantially uniform color pixel spaces of a respective plurality of video frames.

FIG. 1 illustrates one embodiment of a method for determining and embedding a watermark key into a video during a user's video transaction for subsequent use in identifying the video transaction and user. User information may be requested and accepted, such as username, company, or other required user information (block 100) for use by the system. The user may select a video for viewing, downloading, or may select a video for another authorized video transaction (block 102). In one embodiment, an employee of a video editing company, production company, or video marketing company may log in and request to "check out" a video for their work via a digital download or streaming access process. A watermark key, or a plurality of watermark key traces that collectively define the watermark key, may be auto-generated (block 104) upon the checkout request, and may take the form of a symbol, alphanumeric text or a series of similar or dissimilar alphanumeric text that may be referred to individually as watermark key traces or collectively as the watermark key. For example, the watermark traces may consist of the text '00101', 'T0RE$', and '$7ZPp' that collectively make up the "watermark key" for compositing into respective video frames. In an alternative environment, the watermark key may be requested and accepted from a user, such as a "password" or other alphanumeric text (block 106).

An initial video frame may be determined for compositing or "baking" the watermark key into the frame, and a plurality of subsequent frames may also be determined for watermark key traces compositing (block 108). The plurality of subsequent frames may be pre-determined as a series of regularly spaced frames, as measured from the initial frame, such as, for example, frames 10, 20, and 30 of the video, or may be a pre-determined repeating series of frames.

A color space examination may be performed on each pre-determined video frame to quantify the color of each pixel or set of pixels (block 110) in the respective pre-determined video frames to enable further processing. A respective substantially uniform color pixel space is found for each video frame using a color space examination (block 112). For example, if the color space examination for a particular pre-determined video frame finds a contiguous set of pixels having a length and height suitable for compositing a watermark key trace into the video frame, such a uniform color pixel space is selected for further processing. In one example, an acceptable substantially uniform color pixel space may approximate on array of 10×10 pixels. In an alternative implementation, the substantially uniform color pixel space may be acceptable if sufficiently large to enable a watermark consisting of 5 to 50 characters having 8-72 pt. font characters (as displayed on a computer screen, monitor or other digital display device). The substantially uniform color pixel space may be found by comparing the colors of adjacent pixels using red-green-blue (R G B) triplets or using a hexadecimal format (a hex triplets). Using hex triplets, the hex triplet would be a 6-digit, 3-byte hexadecimal number representing the color. Such a hexadecimal number may be represented in a decimal notation, however, and in such a scheme, a uniform color pixel space may be defined as a set of contiguous pixels having the same color, hue, saturation and light values. In an alternative embodiment, each determined uniform color pixel space may have colors bounded by red, green, blue, hue, saturation, and light values that are each no greater than approximately 20% different from a reference pixel within such uniform color pixel space. In a further embodiment, if no appropriate substantially uniform color pixel space is found in a pre-determined frame, the frame choice may be stepped for analysis, whether to the next contiguous frame or to some multiple number of frames from the initial or subsequent pre-determined frame to find a suitable uniform color pixel space for compositing of a watermark key trace.

In an alternative embodiment, rather than the color space examination being performed on the entire field of each determined video frame (block 110), pre-determined quadrants of the pre-determined frame are selected (block 114) and the color space examination performed on those pre-determined quadrants (block 116) in order to increase the speed of subsequent searches looking for the embedded watermark key traces.

An offset color (block 118) may be determined for each respective uniform color pixel space based on the respective reference pixel color described above, or based on an approximate average (such as a calculated average or visually determined average) color of each of the substantially uniform color pixel spaces. In one embodiment using a hexadecimal to decimal notation scheme, an offset color may be chosen that is up to approximately 30% different than the referenced pixel color or approximate average color of the substantially uniform color pixel space in one or more values of the red (Byte 1), green (Byte 2), and blue values (Byte 3), with the hue, saturation and light values also selected to be within approximately 30% of the reference pixel within such space. Each respective watermark key trace may then be composited with each of the respective uniform color pixel spaces, with each respective watermark key trace having the chosen offset color for the associated uniform color pixel space (block 120). For example, if a uniform pixel space is found and selected that has a single color value, the offset color value may be substantially similar and within a small percentage value difference from the uniform pixel space color value, such as 4%, to ensure that a watermark key trace having the offset color remains discernible by a careful viewer or through automated means with suitable post processing. If, however, a uniform pixel space is selected that has pixel colors varying by up to 20%, then an offset color value would be chosen that is greater than 20% different from the reference pixel color or from the approximate average of the uniform pixel space to ensure that a watermark having the offset color remains discernible with suitable post processing.

In an alternative embodiment, a gradient of offset colors may be selected for a given substantially uniform color pixel space or in response to finding a color pixel space that is best characterized as having a gradient color pixel space. If a gradient color pixel space is selected or if the system designer so chooses, a plurality of offset colors may be selected for use with compositing a watermark key (see block 120) with a color pixel space.

The video (hereinafter referred to as a "new video") may be rebuilt with the watermark key traces (block 122) and the key traces and key traces locations ("key forensics") sent to a watermark database to create a watermark database record (block 124) for later retrieval.

In another embodiment, instead of selecting initial and subsequent video frames for compositing of a plurality of watermark key traces that make up the watermark key (block 108), a single video frame (block 126) may be chosen for receipt of the entire watermark key and a color space examination and uniform color pixel space selection made (blocks 110).

Figure 2:
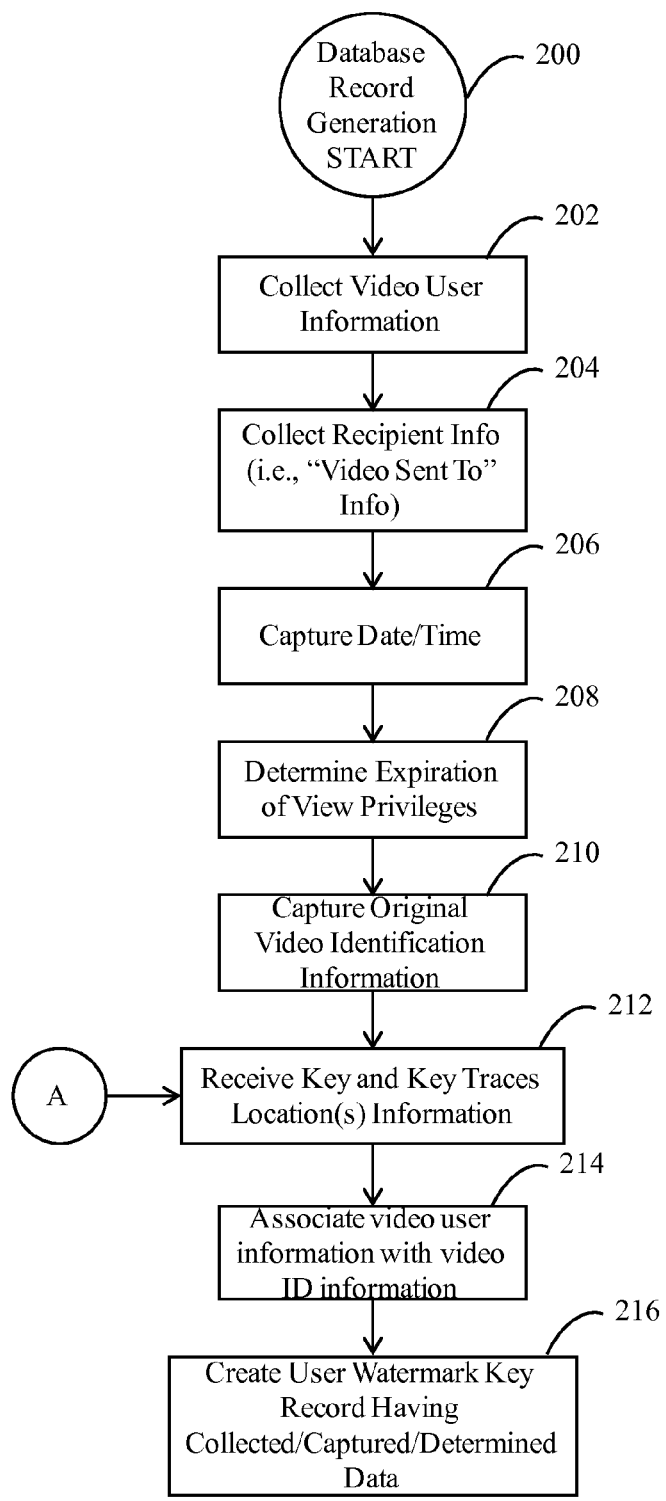
FIG. 2 is a flow diagram illustrating embodiments of a method for building a database user record that has watermark key forensics associated with the user and a video.

FIG. 2 illustrates one embodiment of a method for building a database record. A database record generation is called (block 200) and user information collected (block 202). User information may be collected, for example, through a graphical user interface that may include a web-based portal either explicitly, such as with a user typing in the requested information, or implicitly, such as using a further database pull from another system (not shown) that may provide the user's service subscription information previously collected from the service. Video recipient information is collected, such as where the video will be sent or streamed to (block 204), and the dates and/or time captured (block 206). In a preferred embodiment, an expiration date for viewing privileges is determined (block 208) to limit the time in which such video may be viewed, and original video identification information is captured (block 210), to enable retrieval and processing of the selected video. Key forensics may be received (block 212), such as those determined in the method described in FIG. 1. The watermark key forensics may then be associated with the video user information and video ID information for later lookup (block 214) The key record may then be created that has the data previously collected/captured/determined (block 216).

Figure 3:
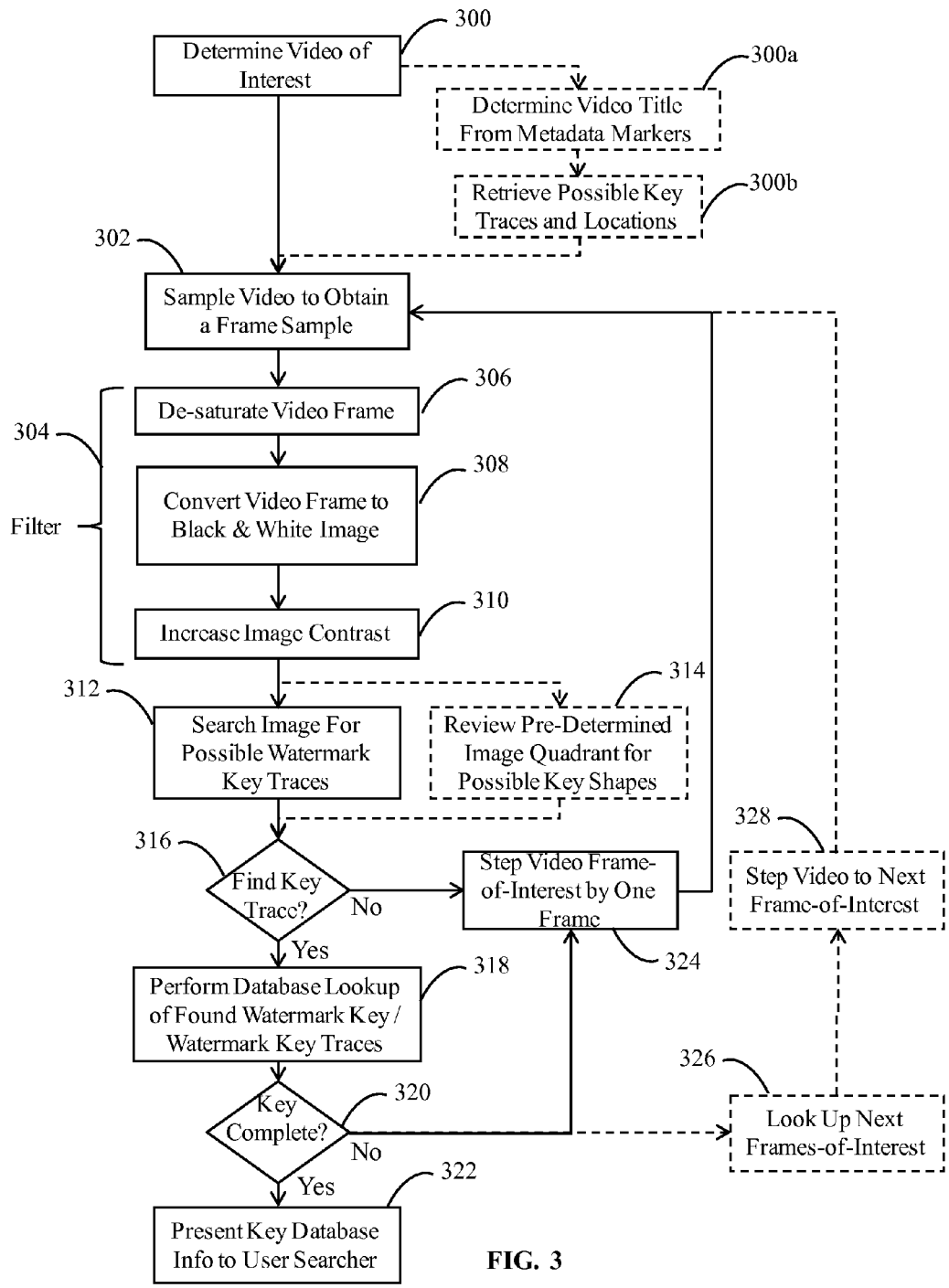
FIG. 3 is a flow diagram illustrating embodiments of a method for retrieving previous user data from a video using an image search for watermark key traces using a watermark key database lookup.

FIG. 3 illustrates one embodiment of a method for retrieving previous user data from a found watermark key to determine an originating user for a video of interest. A video of interest is first determined (block 300). For example, a potentially un-authorized copy of a video may be located on a website, computer or other storage device and the video owner or other interested party may desire to understand who initially retrieved or streamed the video for an otherwise authorized purpose. Initial data about the video may be gathered, such as the video title (block 300). Identification of the video may be aided through examination of metadata markers in the video file (block 300a) which enable retrieval of the possible key traces and video frame locations (block 300b). An initial video frame of the video of interest may be determined and sampled (block 302), such as the first frame of the video. Or, another video frame toward the beginning of the video may be identified and sampled. A filter (block 304) may be applied to the sampled video frame and the resulting filtered image searched for a possible watermark key or watermark key trace embedded in the video, as such embedding was previously described in FIG. 1 (blocks 110, 112, 114, 116). In one embodiment, the filter process (block 304) may include de-saturating the video frame (block 306), converting the video frame to a black-and-white image (block 308), and may include increasing image contrast (block 310) to make any watermark key or watermark key trace composited with the original frame more visible to human or automated examination. The filtered image is searched for possible watermark key or watermark key trace shapes (block 312). In embodiments, the first watermark trace may be a symbol that is more easily found (an "anchor watermark") than typical alphanumeric symbols to increase the likelihood of finding a first watermark key trace during the initial search. Such an anchor watermark may be used to quickly determine whether the video of interest is marked with a watermark key and so deserves careful consideration and further analysis until resolution. In one embodiment, the anchor watermark may be a geometric symbol such as a triangle, square or other polygonal shape.

In one embodiment, where an initial watermark database retrieval indicates a watermark key shape should exist in a previously determined image quadrant (see block 114), such as might be indicated if every instance of authorized access of the titled video included a watermark key in a particular image quadrant, the predetermined image quadrant is reviewed directly for possible key shapes (block 314). In either case, whether resulting from a previously determined image quadrant or through search of the entire image, if a watermark key trace is found (block 316), a database lookup of the found watermark key or watermark key trace is performed (block 318) to determine if the found key is a complete watermark key (block 320) to identify a previous user of the video of interest. If its is determined that a complete key has been found, the interested party is presented with the watermark key database data, or a subset of it, such as the name and company of the person who initially retrieved the video from for an otherwise authorized purpose, as applicable (block 322). If a complete key is not found, such as if a watermark key trace is found (block 320), the video frame search may step to the next video frame (block 324) and the frame sampled (block 302) and filtered (blocks 304) to look for an additional watermark key trace (block 312) to continue the watermark key search. The process (blocks 312, 316, 318, 320) may be repeated by stepping through adjacent and subsequent frames until a complete watermark key is collectively found (block 320) and then presented to the user searcher (block 322).

If no watermark key trace is found in the first frame of the video or the first video frame examined for the search (block 316), the video frame search may be stepped by a frame (block 324) and the frame sampled (block 302) for application of the filter (block 304) to search the filtered image for possible watermark key traces (block 312) as described, above.

In an alternative embodiment, the first found watermark key trace (block 316) may enable a database lookup (block 318) that, if indicating the key is not complete (block 320), may indicate one or more additional frames-of-interest (block 326) and the frame search may progress directly to the next frame-of-interest (block 328) rather than merely stepping the frame count by an arbitrary number or to the next subsequent contiguous frame. The frame-of-interest may then be sampled (block 302), filtered (block 304) and searched for a possible watermark key trace (block 316). If no watermark key trace is found at the first frame-of-interest, the database may indicate the availability of a second frame-of-interest for sampling and filtering.

Figure 4:
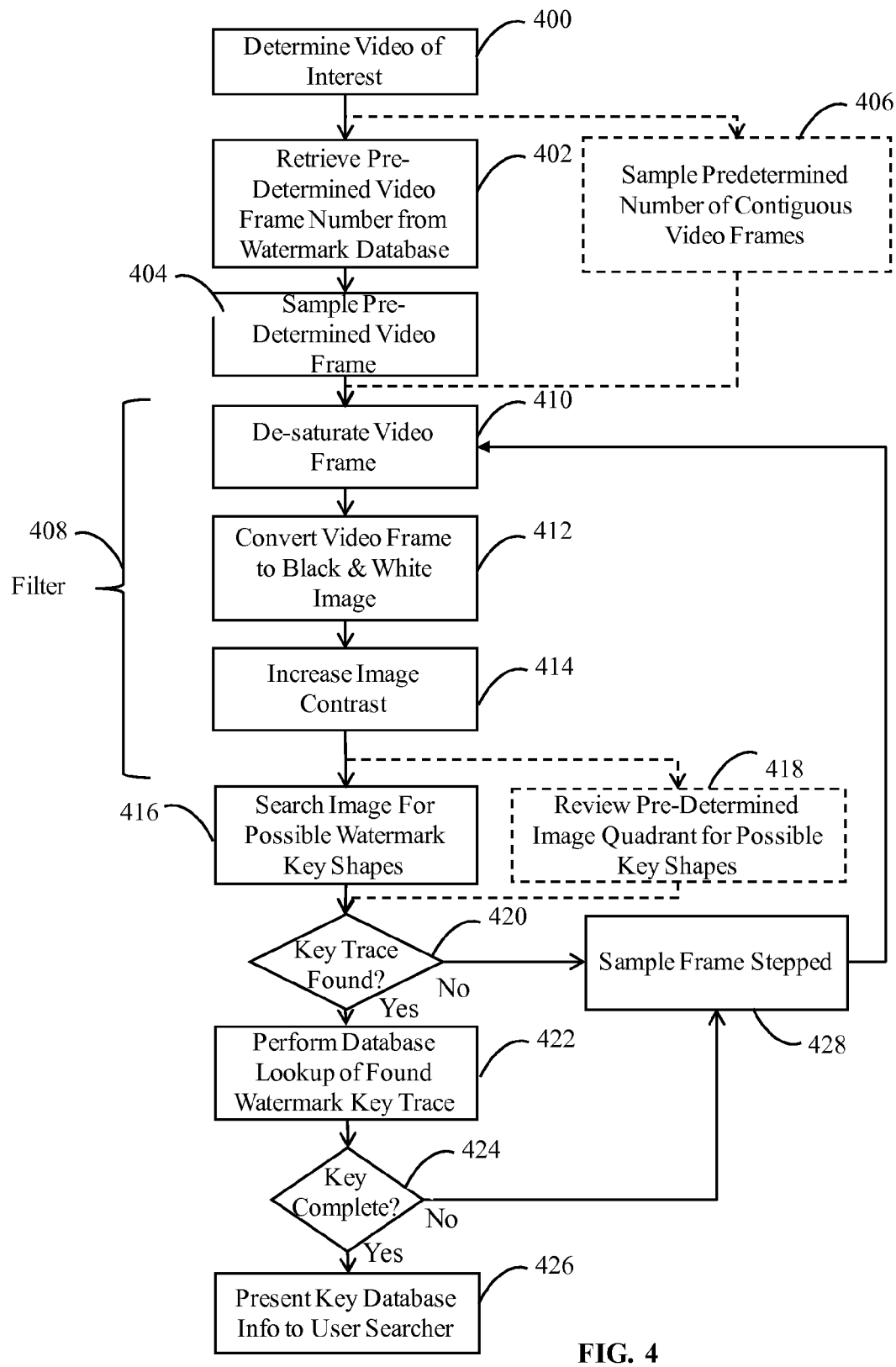
FIG. 4 is flow diagram illustrating another embodiment of a method for retrieving previous user data from a video using an image search for watermark key traces using a watermark key database lookup.

FIG. 4 illustrates another embodiment of a method for retrieving previous user data of a video of interest using a watermark key, with the method using a pre-determined video frame number for the watermark key search. A video of interest is determined (block 400) with sufficient particularity to enable a retrieval of a pre-determined video frame number of interest from a watermark key database (block 402). The retrieved and pre-determined video frame number of interest is sampled (block 404). In one embodiment, if the pre-determined video frame number is not available from the watermark key database, a predetermined number of contiguous video frames are sampled (block 406). A filter (block 408) may be applied to the searched video frame and the resulting filtered image searched for a possible watermark key embedded in the video, as such embedding was previously described in FIG. 1 (blocks 110, 112, 114, 116). In one embodiment, the filter process (block 408) may include de-saturating the video frame (block 410), converting the video frame to a black-and-white image (block 412), and may include increasing image contrast (block 414) to make any possible watermark key or watermark key trace more visible. The filtered image is searched for possible watermark key shapes (block 416), either manually through human visual observation, or through automated means. In embodiments where the watermark database retrieval indicates a watermark key shape should be located in a previously determined image quadrant, the predetermined image quadrant is reviewed for possible key shapes (block 418). If a watermark key shape is found (block 420), a database lookup of the found key is performed (block 422) and if the watermark key is complete (block 424) database information may be presented to the user searcher (block 426). Otherwise, the sample frame may be stepped (block 428) as measured from the pre-determined video frame number of interest, filtered (blocks 410, 412, 414) and the image searched for possible watermark key shapes (block 416).

Figure 5:
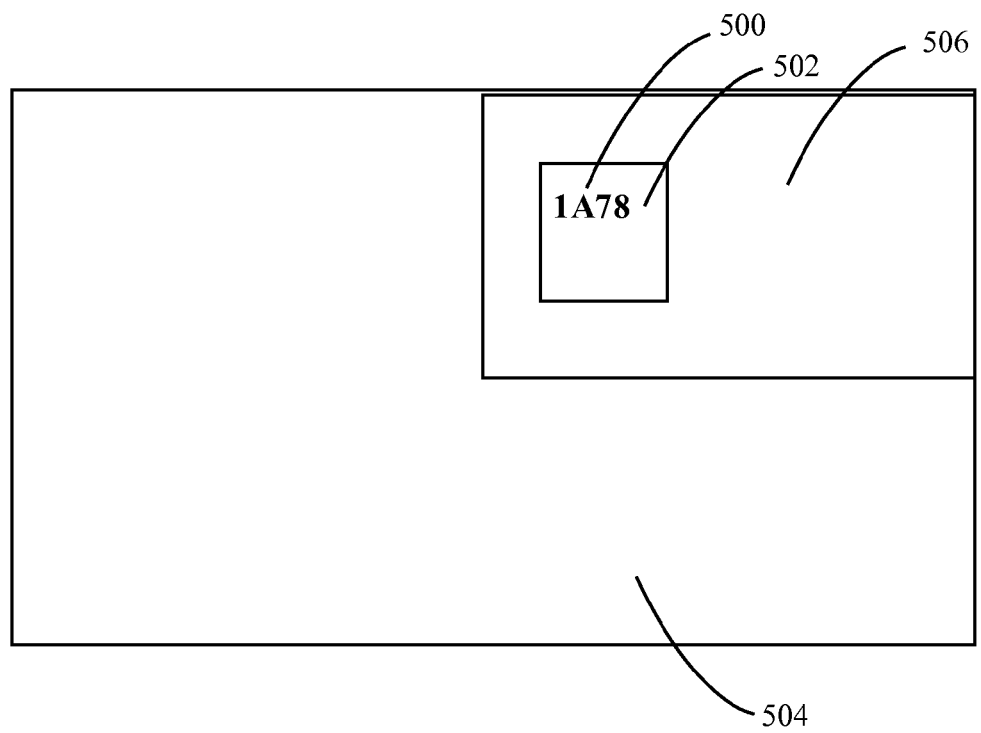
FIG. 5 is a block diagram of one scheme for embedding a watermark key into a substantially uniform color pixel space that resides in a quadrant of a video frame.

FIG. 5 illustrates a scheme for selecting a frame quadrant and selecting a substantially uniform color pixel space in a selected video frame for compositing a watermark key with the pixel space. As used herein, a watermark key 500, indicated as the alphanumeric "1A78", may be composited with a substantially uniform color pixel space and subsequently read from the space 502. Although the uniform color pixel space resides in the single video frame 504, it may also be defined as residing in a quadrant 506 of the video frame 504.

While various implementations of the application have been described, it will be apparent to those of ordinary skill in the art that many more embodiments and implementations are possible that are within the scope of this invention.

What is claimed is:

1. A watermarking method, comprising:
   determining a first substantially uniform color pixel space in a first frame of a video;
   determining a first offset color based on the first substantially uniform color pixel space; and
   compositing a first watermark trace of a watermark key having the first offset color into the substantially uniform color pixel space;
   wherein a modified video frame is creating having the first watermark trace of the watermark key having the first offset color.

2. The method of claim 1, further comprising:
   rebuilding the video with the modified video frame.

3. The method of claim 2, wherein the watermark key consists of the first watermark trace in the modified video frame.

4. The method of claim 1, further comprising:
   determining a second substantially uniform color pixel space in a second frame of the video;
   determining a second offset color based on the second substantially uniform color pixel space of the second frame; and
   compositing a second watermark trace of the watermark key having the second offset color into the second substantially uniform color pixel space of the second frame of the video;
   wherein a second modified video frame is creating having the second watermark trace of the watermark key.

5. The method of claim 4, wherein the watermark key comprises a plurality of watermark traces in a respective plurality of modified video frames.

6. The method of claim 5, further comprising:
   saving the first and second frame locations of the respective first and second watermark traces of the watermark key into a database in association with a user information, the user information comprising the user's name.

7. The method of claim 1, further comprising:
   saving the frame location of the at least one watermark trace into a database in association with a user information, the user information comprising the user's name.

8. The method of claim 1, wherein the first watermark key is a geometric symbol.

9. The method of claim 1, wherein the first watermark key is at least one alphanumeric symbol suitable for automated optical character recognition (OCR).

10. The method of claim 5, further comprising:
    receiving watermark key location information, wherein the watermark key location information comprises a location of the plurality of watermark traces in the respective plurality of modified video frames.

11. The method of claim 10, wherein the watermark key location information comprises an image quadrant location and the modified video frame.

12. The method of claim 10, further comprising:
    collecting video user information;
    associating video user information with video identification information; and
    saving the video identification information and associated video user information with the watermark key location information in a database.

13. The method of claim 12, further comprising:
    performing a database lookup in the database of found watermark traces of the watermark key.

14. The method of claim 1, further comprising:
    filtering the modified video frame to obtain a first filtered image.

15. The method of claim 14, further comprising:
    searching the first substantially uniform color pixel space of the first filtered image for the first watermark trace.

16. The method of claim 15, wherein the searching of the first substantially uniform color pixel space of the first filtered image is restricted to a pre-determined quadrant of the first filtered image to reduce the search time.

17. The method of claim 15, further comprising:
    performing a database lookup of a found first watermark trace to determine if the found first watermark trace is a complete watermark key, wherein the complete watermark key identifies a previous user.

18. The method of claim 4, further comprising:
    filtering the modified video frame to obtain a first filtered image;
    searching the first substantially uniform color pixel space of the first filtered image for the first watermark trace;
    performing a database lookup of a found first watermark trace to determine if the found first watermark trace is a complete watermark key, wherein the complete watermark key identifies a previous user;
    sampling the second modified video frame if the found first watermark trace is not the complete watermark key; and
    searching the second substantially uniform color pixel space of the second modified video frame for the second watermark trace.

19. The method of claim 18, wherein the second modified video frame is at least one of: a video frame that is immediately adjacent to the modified video frame, and a video frame-of-interest whose location is determined from the database lookup of the found first watermark trace.

20. The method of claim 18, further comprising:
    performing a second database lookup of a second found watermark trace to determine if the first and second found watermark traces establish a complete watermark key.

* * * * *